United States Patent Office 3,376,221
Patented Apr. 2, 1968

3,376,221
METAL SALTS OF MIXED PHOSPHOROTHIOIC AND PHOSPHINOTHIOIC ACIDS
Thomas Albert Butler, Cleveland, Ohio, assignor to The Lubrizol Corporation, Wickliffe, Ohio, a corporation of Ohio
No Drawing. Original application Aug. 3, 1964, Ser. No. 387,171, now Patent No. 3,300,409, dated Jan. 24, 1967. Divided and this application Sept. 14, 1966, Ser. No. 579,224
18 Claims. (Cl. 252—32.7)

This application is a division of co-pending application Ser. No. 387,171 filed Aug. 3, 1964, Patent No. 3,300,409.

This invention relates to metal salts of phosphorus acids. In a more particular sense it relates to metal salts of phosphorus acids which are soluble in oils and are useful as additives in oils such as lubricating oils, metal working oils, transformer oils, fuels, power transmitting fluids, etc.

Oil-soluble metal salts of phosphorus acids are useful for a variety of purposes. A principal utility of such metal salts is as additives in oils to impart extreme pressure properties and to reduce the tendency of the oil to undergo degradation and form harmful corrosive degradation products.

Accordingly, it is an object of this invention to provide novel compositions of matter.

It is also an object of this invention to provide metal salts of phosphorus acids.

It is also an object of this invention to provide compositions useful as additives in oils.

It is also an object of this invention to provide stabilized oil compositions.

It is further an object of this invention to provide improved lubricating compositions.

These and other objects are obtained in accordance with this invention by providing a metal salt of a phosphorus acid mixture comprising (A) a dihydrocarbon phosphorothioic acid having at least 3 aliphatic carbon atoms in each hydrocarbon radical and (B) a diaryl phosphinothioic acid wherein the aryl group is selected from the class consisting of phenyl, halophenyl, and alkylphenyl having up to about 6 carbon atoms in the alkyl substituent; wherein the molar ratio of (A) to (B) is within the range of from 1:2 to 1:0.05 and the ratio of aliphatic carbon atoms to phosphorus atoms is at least about 6.

The metal of the metal salts of this invention is a polyvalent metal and may be a metal of Group II of the Periodic Table such as calcium, barium, magnesium, strontium, zinc, or cadmium. It may likewise be lead, iron, manganese, copper, cobalt, nickel, chromium, or molybdenum. The salts of zinc, barium, calcium, and lead are especially preferred.

The dihydrocarbon phosphorothioic acid of (A) may be a phosphoromonothioic or phosphorodithioic acid. The hydrocarbon groups must contain at least three aliphatic carbon atoms and may be alkyl, cycloalkyl, alkaryl, or aralkyl radicals. Especially useful as the hydrocarbon group is an alkyl radical having up to about 30 carbon atoms. Also useful are cycloalkyl radicals such as alkyl-substituted cyclohexyl and cyclopentyl radicals in which the alkyl substituent has up to about 30 carbon atoms; alkaryl radicals such as alkyl-substituted phenyl and naphthyl radicals in which the alkyl substituent has up to about 200 carbon atoms; and aralkyl radicals such as phenyl- or naphthyl-substituted alkyl radicals having up to about 30 carbon atoms as well as derivatives thereof in which the phenyl and naphthyl group are substituted with alkyl groups. The hydrocarbon groups are illustrated by propyl, butyl, cyclohexyl, cyclopentyl, n-hexyl, 4-methylpentyl, iso-octyl, dodecyl, behenyl, octadecyl, 5-nonyldecyl, heptyl, 2-phenyl-hexyl, dodecylphenyl, 3-butylphenyl, 2,6-dibutylphenyl, polypropene (molecular weight of 1000)-substituted phenyl, polybutene (molecular weight of 300)-substituted phenyl, and 4-cyclohexyl-dodecyl.

Specific examples of the dihydrocarbon phosphorothioic acid of (A) include diisopropyl phosphorodithioic acid, dihexyl phosphorodithioic acid, di(hexylphenyl) phosphorodithioic acid, dibenyl phosphorodithioic acid, di (polypropylene (molecular weight of 350)-substituted phenyl) phosphorodithioic acid, cyclohexyl iso-octyl phosphorodithioic acid, di-primary-pentyl phosphorodithioic acid, dihexyl phosphoromonothioic acid, di-primary-octyl phosphoromonothioic acid, and dodecyl heptyl phosphoromonothioic acid.

The dihydrogen phosphorodithioic acid is obtained most conveniently by the reaction of phosphorus pentasulfide with an alcohol or an alkylphenol. The reaction involves four moles of the alcohol or alkylphenol per mol of phosphorus pentasulfide and may be carried out within the temperature range of from about 50° C. to about 250° C. For instance, the preparation of dihexyl phosphorodithioic acid involves the reaction at about 100° C. of phosphorus pentasulfide with four moles of a hexyl alcohol. Hydrogen sulfide is liberated and the residue is the defined acid. Phosphoromonothioic acids can be obtained by treating the corresponding dithioic acid with steam or water under controlled conditions so as to replace one sulfur atom from the dithioic acid with an oxygen atom.

The diaryl phosphinothioic acid of (B) likewise may be a phosphinomonothioic or phosphinodithioic acid. As indicated previously, the aryl group of the phosphinothioic acid is phenyl, halophenyl, or alkylphenyl having up to about 6 carbon atoms in the alkyl substituent. Examples of such acid are diphenyl phosphinodithioic acid, diphenyl phosphinomonothioic acid, di(chlorophenyl) phosphinomonothioic acid, di(dichlorophenyl) phosphinodithioic acid, phenyl bromophenyl phosphinodithioic acid, ditolyl phosphinodithioic acid, di(hexylphenyl) phosphinodithioic acid, di(cyclopentylphenyl) phosphinodithioic acid, di (iodophenyl) phosphinodithioic acid, di(methylphenyl) phosphinodithioic acid, di(trimethylphenyl) phosphinodithioic acid, and di(2-bromo-6-ethylphenyl) phosphinodithioic acid.

The diaryl phosphinothioic acid of (B) can be obtained by the reaction of an aromatic hydrocarbon with phosphorus pentasulfide, preferably in the presence of a Friedel-Crafts catalyst such as aluminum chloride, ferric chloride, zinc chloride, boron trifluoride, or aluminum bromide. The reaction is usually carried out at a temperature of from about 60° C. to 250° C. The product of the reaction is a complex of the phosphinodithioic acid and the catalyst. The acid is conveniently recovered from the complex by treating the latter with water or ice at relatively low temperatures such as 0°–50° C. A commonly used procedure for preparing the acid is described in U.S. Patent No. 2,797,238. The following procedure is illustrative: aluminum chloride (2.5 moles) is added to a mixture of isopropyl benzene (4.4 moles) and phosphorus pentasulfide (1 mole) at 90°–95° C. in 2 hours. The resulting mixture is heated to 120° C. and then held at that temperature for 5 hours. The residue is diluted with toluene and then treated with water at 50°–70° C. The organic layer is heated at 115° C./1 mm. to distill off toluene. The residue is di(isopropylphenyl) phosphinodithioic acid. The corresponding phosphinomonothioic acid may be prepared by treating the dithioic acid with water or steam under controlled conditions to effect a partial hydrolysis.

The metal salt of this invention is obtained by neutralizing a mixture of the phosphorothioic acid of (A) and the phosphinothioic acid of (B) with a metal reactant such as the elemental metal or the hydroxide, oxide, carbonate, bicarbonate, hydride, mercaptide, or sulfide of the metal. The conditions under which the neutralization can be carried out usually include a temperature within the range of from about 25° C. to about 250° C., more often from about 80° C. to about 200° C. Although temperatures above about 250° C. are rarely necessary, they may be used provided that they are below the decomposition point of the reaction mixture. The neutralization can be effected simply by preparing a mixture of the phosphorothioic acid and the phosphinothioic acid and then contacting the acid mixture with a stoichiometric amount (or a slight excess) of the metal reactant or by contacting the metal reactant with one of the two acid reactants and then with the other. A solvent or diluent may be used in the process to facilitate mixing and control of temperature. The solvent of diluent may be mineral oil, xylene, naphtha, benzene, chlorobenzene, hexane, dioxane, Cellosolve, ether, or the like.

A critical aspect of the metal salt of the invention is that it contains within its molecular structure an average of at least about 6 aliphatic carbon atoms per phosphorus atom. Unless this minimum requirement with respect to the number of aliphatic carbon atoms is met, the metal salt will not be sufficiently soluble in a hydrocarbon oil to be useful as an additive therein nor will it have the improved effectiveness necessary for the purposes of this invention. Metal salts in which the ratio of aliphatic carbon atoms to phosphorus atoms is at least about 8 are especially preferred.

Another critical element of the metal salt of the invention is that the acid mixture from which the metal salt is derived must contain the phosphorothioic acid of (A) and the phosphinothioic acid of (B) in a molar ratio within the range of from about 1:2 to 1:0.05, preferably from about 1:1 to 1:0.2. This criticality likewise is based on considerations of oil-solubility, thermal stability, and effectiveness of the metal salts as oil additives.

The following examples illustrate the metal salt compositions of this invention:

Example 1

A mixture of 0.9 mole of di-(chlorophenyl)phosphinodithioic acid and 1.1 moles of di-isooctyl phosphorodithioic acid is heated to 60° C. and mixed with 1.05 moles of zinc oxide. To this mixture there is added 1.6 moles of di-isooctyl phosphorodithioic acid at 90° C. and then there is added 0.82 mole of zinc oxide. The resulting mixture is heated at 90° C. for 1 hour and then to 150° C./20 mm. The residue is filtered. The filtrate is the desired metal salt composition having a zinc content of 9.5%, a phosphorus content of 7.9%, a sulfur content of 15.5% and a chlorine content of 3.4%.

Example 2

To a mixture of 0.4 mole of di(chlorophenyl)phosphinodithioic acid and 0.6 mole of a dialkyl phosphorodithioic acid (prepared by the reaction of 1 mole of phosphorus pentasulfide with 4 moles of a commercial primary alcohol mixture consisting essentially of $C_{12}$ and $C_{14}$ alcohols, there is added 0.625 mole of zinc oxide at 65° C. within a period of 1 hour. The resulting mixture is heated at 65°–85° C. for 2 hours and then at 117° C. for 1.2 hours. The residue is filtered. The filtrate is a metal salt composition having a zinc content of 7.2%, a phosphorus content of 6.9%, a sulfur content of 14.1% and a chlorine content of 5.9%.

Example 3

A mixture of isopropyl benzene (52.8 parts by weight), phosphorus pentasulfide (22.2 parts), and aluminum chloride (33.3 parts) is maintained at 120° C. for 8 hours. Hydrogen sulfide is evolved. The mixture is diluted with toluene and hydrolyzed with water (420 parts) at 50°–70° C. The organic layer is recovered and heated to 115° C./100 mm. in 5 hours whereupon water and toluene are distilled off. The residue is di-(isopropylphenol)phosphinodithioic acid. A mixture of 40 mole percent of this acid and 60 mole percent of diisooctyl phosphorodithioic acid is neutralized with a slight stoichiometric excess of zinc oxide at 60°–70° C. The neutralized product is filtered and the filtrate is treated with water and then stripped by heating it to 100° C./100 mm. It is then diluted with mineral oil to an 85.7% oil concentrate. The concentrate is filtered and the filtrate has a phosphorus content of 6.7%, a zinc content of 6.8%, and a sulfur content of 14%.

Example 4

A mixture of 0.45 mole of di(isopropylphenyl)phosphinodithioic acid, 0.55 mole of the dialkyl phosphorodithioic acid of Example 2, and 0.62 mole of zinc oxide is heated at 40° C. for 2 hours, then at 90°–120° C. for 1.5 hours and filtered. The filtrate is heated to 125° C./22 mm. The residue is a metal salt composition having a zinc content of 6.3%, a phosphorus content of 6.4%, and a sulfur content of 12.3%.

Example 5

A phosphorodithioic acid is prepared by reacting 1 mole of phosphorus pentasulfide with 4 moles of an alcohol mixture consisting of 65 mol percent of isobutyl alcohol and 35 mole percent of primary-pentyl alcohol. The phosphorodithioic acid has an acid number of 198. To a mixture of 1075 grams (3.8 moles) of the phosphorodithioic acid and 149 grams (0.2 mole of di(isopropylphenyl) phosphinodithioic acid) there is added 179 grams (2.2 moles) of zinc oxide at 60°–90° C. The reaction is exothermic. The resulting mixture is heated at 80°–90° C. for 1 hour and then at 140° C./15 mm. The residue is filtered. The filtrate is a metal salt composition having a zinc content of 11.9%, a sulfur content of 20.6% and a phosphorus content of 10.6%.

Example 6

A metal salt composition is prepared by the procedure of Example 5 except that the amount of the phosphorodithioic acid used is 1020 grams (3.6 moles) and the amount of the di(isopropylphenyl)phosphinodithioic acid used is 299 grams (0.4 mole). The resulting metal salt composition has a zinc content of 11.6%, a sulfur content of 20%, and a phosphorus content of 10.8%.

Example 7

A metal salt composition is prepared by the procedure of Example 5 except that the amount of the phosphorodithioic acid used is 850 grams (3 moles) and the amount of the di(isopropylphenyl) phosphinodithioic acid used is 750 grams (1 mole). The resulting metal salt composition has a zinc content of 11.3%, a sulfur content of 19%, and a phosphorus content of 10.3%.

Example 8

A metal salt composition is prepared by the procedure of Example 1 except that the amount of the phosphorodithioic acid used is 907 grams (2.4 moles) and the amount of the di(isopropylphenyl) phosphinodithioic acid used is 450 grams (0.6 mole). The resulting metal salt composition has a zinc content of 9%, a sulfur content of 15%, and a phosphorus content of 8%.

Example 9

A mixture of 0.8 mole of di(isopropyphenyl phosphinodithioic acid and 1.2 moles of the dialkyl phosphorodithioic acid of Example 2 is heated to 50° C. To this mixture there is added 1 mole of lead oxide. An exothermic reaction occurs. The resulting mixture is heated to 125° C./25 mm. and filtered. The filtrate has a lead content of 17.2%, a sulfur content of 11.7%, and a phosphorus content of 5.6%.

Example 10

To a mixture of 0.8 mole of di(chlorophenyl) phosphinodithioic acid and 1.2 moles of diisooctyl phosphorodithioic acid at 55° C. there is added 1 mole of lead oxide. An exothermic reaction occurs. The resulting mixture is heated at 120° C. for 0.5 hour, mixed with one-fourth its weight of mineral oil, heated to 120° C./20 mm. and filtered. The filtrate has a lead content of 16.8%, a chlorine content of 4.0%, a sulfur content of 10%, and a phosphorus content of 5.1%.

Example 11

Zinc oxide (1 mole) is added at 50°–60° C. to diisooctyl phosphorodithioic acid (1.2 moles) and bis-(dichlorophenyl) phosphinodithioic acid (0.8 mole) and the resulting mixture is heated at 95° C. for 0.5 hour, then at 125° C./25 mm. and diluted with one-fourth its weight of mineral oil. The residue is filtered. The filtrate is a metal salt composition having a zinc content of 5.4%, a chlorine content of 9.8%, a sulfur content of 12.6%, and a phosphorus content of 5.8%.

Example 12

Zinc oxide (2.5 moles) is added to a mixture of di(4-methyl-2-pentyl) phosphorodithioic acid (2.6 moles) and di(chlorophenyl) phosphinodithioic acid (1.4 moles at 60°–80° C.). An exothermic reaction occurs. The mixture is heated at 80–85° C. for 2.5 hours and that at 100° C./43 mm. and filtered. The filtrate is mixed with 19% of its weight of mineral oil. The resulting oil solution of the metal salt composition has a zinc content of 8.7%, a chlorine content of 5.2%, a sulfur content of 14.8%, and a phosphorus content of 7.2%.

Example 13

A mixture of 3 moles of di(n-hexyl) phosphorodithioic acid and 2 moles of di(chlorophenyl) phosphinodithioic acid is heated to 60° C. and mixed slowly with 3.1 moles of zinc oxide at 60°–80° C. An exothermic reaction occurs. The resulting mixture is heated at 80°–85° C. for 2 hours and filtered. The filtrate is heated to 85° C./30 mm., mixed with 29% of its weight of mineral oil and again filtered. The filtrate is an oil solution of the metal salt composition having a zinc content of 7.5%, a chlorine content of 4.1%, a sulfur content of 12.6%, and a phosphorus content of 6.2%.

Example 14

To a mixture of 3 moles of di-isooctyl phosphorodithioic acid and 2 moles of di(chlorophenyl) phosphinodithioic acid there is added 5.7 moles of copper at 60° C. The mixture is heated at 80°–90° C. for 30 hours. The residue is mixed with 33% of its weight of mineral oil, heated to 120° C./10 mm. and filtered. The filtrate has a copper content of 6.2%, a chlorine content of 2.4%, a sulfur content of 7.5%, and a phosphorus content of 4.7%.

Example 15

Iron (52 grams, 0.93 mole) is aded to a mixture of 1.5 moles of di-isooctyl phosphorodithioic acid and 1 mole of di(chlorophenyl) phosphinodithioic acid. The mixture is heated at 80°–85° C. for 14 hours at 120° C./10 mm. and filtered. The filtrate is the metal salt composition having an iron content of 5.9%, a chlorine content of 1.9%, a sulfur content of 13.5%, and a phosphorus content of 8.6%.

Example 16

A phosphorodithioic acid is prepared by the reaction of 1 mole of phosphorus sulfide with 4 moles of propylene tetramer-substituted phenol. The phosphorodithioic acid has an acid number of 93. To a mixture of 722 grams (1.2 moles) of the phosphorodithioic acid and 650 grams (0.8 mole) of di(chlorophenyl) phosphinodithioic acid there is added, at 60°–75° C., 45 grams (0.55 mole) of zinc oxide and then there is added at 75°–85° C. another portion, 45 grams, of zinc oxide. The resulting mixture is heated at 80°–85° C. for 1 hour mixed with 1060 grams of mineral oil, heated to 120° C./10 mm., mixed with a filter aid and filtered. The filtrate is a 50% oil solution of the metal salt composition and is found to have a zinc content of 2.9%, a chlorine content of 2.4%, a sulfur content of 5.1%, and a phosphorus content of 2.5%.

Example 17

To a mixture of di(isopropylphenyl) phosphinodithioic acid (1 mole), di-isooctyl phosphorodithioic acid (1.5 moles), and water (1.5 moles), there is added at 50°–80° C. manganese carbonate (MgCO₃) (1.49 moles). The mixture is heated at 80° C. for 2 hours, then to 95° C./25 mm., and filtered. The filtrate is the manganese salt having a manganese content of 4.25%, a sulfur content of 15.8%, and a phosphorus content of 7.92%.

Example 18

To a mixture of 2 moles of di(4-methyl-2-pentyl) phosphorodithioic acid and 1.2 moles of di(chlorophenyl) phosphinodithioic acid at 50°–70° C., there is added 10 grams of water and 202 grams of cobalt carbonate (CoCO₃) within a period of 30 minutes. The resulting mixture is heated at 70° C. for 1 hour, mixed with 10 grams of cobalt carbonate, again heated at 90° C. for 1 hour and then to 95° C./10 mm. The residue is mixed with 600 grams of mineral oil and filtered. The filtrate is an oil solution of a metal salt composition having a cobalt content of 4.2%, a chlorine content of 3.5%, a sulfur content of 12.8%, and a phosphorus content of 5.7%.

Example 19

To a mixture of 1.5 moles of di-isooctyl phosphorodithioic acid and 1 mole of di(chlorophenyl) phosphinodithioic acid there is added at 60°–70° C., 1.4 moles of iron. The resulting mixture is heated at 80° C. for 10 hours and then to 120° C./20 mm. The residue is filtered. The filtrate is the metal salt composition having an iron content of 6.4%, a chlorine content of 7.4%, a sulfur content of 15.1%, and a phosphorus content of 8.3%.

Example 20

To a mixture of 0.4 mole of di-cyclohexyl phosphinomonothioic acid and 1.6 moles of didodecyl phosphorodithioic acid, there is added at 60°–70° C. 1 mole of calcium hydroxide. The mixture is heated at 80° C. for 10 hours, then heated to 120° C./20 mm., and filtered. The filtrate is the desired calcium salt.

Example 21

To an equimolar mixture of ditolyl phosphinodithioic acid and di(polyisobutene (molecular weight of 1000)-substituted phenol) phosphorodithioic acid there is added a stoichiometric amount of barium in small increment at 25°–80° C. The mixture is heated at 100° C. for 5 hours and filtered. The filtrate is the metal salt.

Example 22

Magnesium methoxide is formed by adding magnesium turnings (2 moles) to 20 moles of methyl alcohol at reflux temperature. To this mixture there is added 1.6 moles of di(propylphenyl) phosphinodithioic acid and 2.4 moles of dibehenyl phosphoromonothioic acid at 50°–70° C. The mixture is held at this temperature for 10 hours and then heated under reduced pressure to distill off methanol. The residue is the metal salt.

Example 23

A mixture of 0.4 mole of dixylyl phosphinodithioic acid and 0.6 mole of dioctadecyl phosphorodithoic acid is dissolved in 5 times its volume of xylene. The mixture is then neutralized with 0.6 mole of nickel carbonate (NiCO₃) at 100°–120° C. The residue is then heated under reduced pressure to distill off xylene and filtered. The filtrate is the metal salt.

Example 24

Di(2,4,6-trimethylphenyl) phosphinodithioic acid (0.8 mole) is mixed with chromic oxide (0.7 mole) in the presence of dioxane and water at 80°–90° C. To this mixture there is added 1.2 moles of didodecyl phosphorodithioic acid. The resulting mixture is heated at 80°–90° C. for 6 hours and then heated under reduced pressure to remove water and dioxane. The residue is filtered. The filtrate is the chromium salt.

Example 25

A mixture of 0.4 mole of di(2-methyl-6-butylphenyl) phosphinodithioic acid and 0.6 mole of (didodecylphenyl) phosphorodithioic acid is dissolved in toluene and then treated with 1 mole of sodium molybdate at 60°–120° C. The mixture is heated at this temperature for 8 hours and then heated under reduced pressure to remove toluene. The residue is filtered and the filtrate is the molybdenum salt.

Example 26

Zinc oxide (1 mole) is added to 0.4 mole of di(bromophenyl) phosphinodithioic acid and 1.6 moles of di(polyisobutene (molecular weight of 50,000)-substituted phenyl) phosphorodithioic acid at 50°–80° C. The mixture is diluted with mineral oil and heated at 120° C. for 6 hours and filtered. The filtrate is diluted further to an oil content of 60% (by weight).

Example 27

A mixture of 0.6 mole of di(2,4,6-trichlorophenyl) phosphinodithioic acid and 1.4 moles of dicyclohexyl phosphorodithioic acid in benzene is neutralized with 1.2 moles of zinc oxide at 80° C. The residue is heated under reduced pressure to distill off benzene and filtered. The filtrate is the metal salt.

Example 28

A mixture of 0.2 mole of diphenyl phosphinodithioic acid and 1.8 moles of di(octylphenyl) phosphorodithioic acid in an equal volume of mineral oil is neutralized with 1.2 moles of zinc oxide. The neutralized product is then filtered.

Example 29

A phosphorodithioic acid is obtained by reacting 1 mole of phosphorus pentasulfide with an alcohol mixture consisting of 20 mole percent of isobutyl alcohol and 80 mole percent of decyl alcohol at 100° C. To a mixture of 1.6 moles of the phosphorodithioic acid and 0.4 mole of di-(neopentylphenyl) phosphinodithioic in an equal volume of mineral oil there is added 1.2 moles of zinc oxide. The mixture is then heated at 80°–120° C. for 4 hours and filtered. The filtrate is the desired zinc salt.

The metal salts of this invention, as indicated previously, are principally useful as additives for use in hydrocarbon oils, especially lubricating oils. In such use they are effective to improve the oxidation resistance and the thermal stability of lubricating oils. For most applications, the presence of a small amount, i.e., from about 0.01% to 1% by weight as phosphorus, of the metal salt, is sufficient to impart the desirable properties to a lubricating oil. For instance, lubricants for use in gasoline internal combustion engines and transmissions of automotive vehicles may contain from about 0.01% to about 0.2% by weight of phosphorus of the metal salt whereas lubricants for use in gears and diesel engines may contain as much as 1% or even more of phosphorus as the metal salt. Other hydrocarbon compositions such as gasolines and fuel oils likewise may contain the metal salt as an additive, usually at a concentration from about 0.001% to about 0.1%.

The lubricating oils in which the metal salts of this invention are useful as additives may be of synthetic, animal, vegetable or mineral origin. Ordinarily mineral lubricating oils are preferred for reasons of their availability, general excellence, and low cost. For certain applications, oils belonging to one of the other groups may be preferred. For instance, poly (alkylene glycol) oils and synthetic polyester oils such as didodecyl adipate and dioctyl sebacate are often preferred as jet engine lubricants. Normally, the lubricating oils preferred will be fluid oils ranging in viscosity from about 40 Saybolt Universal seconds at 110° F. to about 200 Saybolt Universal seconds at 210° F.

The invention contemplates also the presence of other additives in the lubricating compositions. Such additives include, for example, supplemental detergents of the ash-containing type, viscosity index improving agents, pour point depressing agents, anti-foam agents, extreme pressure agents (e.g., sulfurized fatty acid esters, polysulfides, phosphosulfurized fatty acid esters), rust-inhibiting agents, and supplemental oxidation and corrosion-inhibiting agents (e.g., hindered phenols, phosphites, or metal phenates).

The ash-containing detergents are exemplified by oil-soluble neutral and basic salts of alkali of alkaline earth metals with sulfonic acids, carboxylic acids, or organic phosphorus acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium, and barium.

The term "basic salt" is used to designate the metal salts wherein the metal is present in stoichiometrically larger amounts than the organic acid radical. The commonly employed methods for preparing the basic salts involves heating a mineral oil solution of an acid with a stoichiometric excess of a metal neutralizing agent such as the metal oxide, hydroxide, carbonate, bicarbonate, or sulfide at a temperature about 50° C. and filtering the resulting mass. The use of a "promoter" in the neutralization step to aid the incorporation of a large excess of metal likewise is known. Examples of compounds useful as the promoter include phenolic substances such as phenol, naphthol, alkylphenol, thiophenol, sulfurized alkylphenols, and condensation productions of formaldehyde with a phenolic substance; alcohols such as methanol, 2-propanol, octyl alcohol, Cellosolve, carbitol, ethylene glycol, stearyl alcohol, and cyclohexyl alcohol; amines such as aniline, phenylenediamine, phenothiazine, phenyl-beta-naphthylamine, and dodecylamine. A particularly effective method for preparing the basic salts comprises mixing an acid with an excess of basic alkaline earth metal neutralizing agent, a phenolic promoter compound, and a small amount of water and carbonating the mixture at an elevated temperature such as 60°–200° C.

The preparation of a basic sulfonate detergent is illustrated as follows: a mixture of 490 parts (by weight) of a mineral oil, 110 parts of water, 61 parts of heptylphenol, 340 parts of barium mahogany sulfonate, and 227 parts of barium oxide is heated at 100° C. for 0.5 hour and then to 150° C. Carbon dioxide is then bubbled into the mixture until the mixture is substantially neutral. The mixture is filtered and the filtrate found to have a sulfate ash content of 25%.

The preparation of a calcium sulfonate is illustrated by the following process: a mixture of 520 parts (by weight) of a mineral oil, 480 parts of a sodium petroleum sulfonate (molecular weight of 480), and 84 parts of water is heated at 100° C. for 4 hours. The mixture is then heated with 86 parts of a 76% aqueous solution of calcium chloride and 72 parts of lime (90% purity) at 100°

C. for 2 hours, dehydrated by heating to a water content of less than 0.5%, cooled to 50° C., mixed with 130 parts of methyl alcohol, and then blown with carbon dioxide at 50° C. until substantially neutral. The mixture is then heated to 150° C. to distill off methyl alcohol and water and the resulting oil solution of the basic calcium sulfonate is filtered. The filtrate is found to have a calcium sulfate ash content of 16% and a metal ratio of 2.5. A mixture of 1305 grams of the above carbonated calcium sulfonate, 930 grams of mineral oil, 220 grams of methyl alcohol, 72 grams of isobutyl alcohol, and 38 grams of amyl alcohol is prepared, heated to 35° C., and subjected to the following operating cycle 4 times: mixing with 143 grams of 90% calcium hydroxide and treating the mixture with carbon dioxide until it has a base number of 32–39. The resulting product is then heated to 155° C. during a period of 9 hours to remove the alcohols and then filtered through a siliceous filter aid at this temperature. The filtrate has a calcium sulfate ash content of 39.5%, and a metal ratio of 12.2.

The preparation of a basic barium salt of a phosphorous acid is illustrated as follows: a polyisobutene having a molecular weight of 50,000 is mixed with 10% by weight of phosphorus pentasulfide at 200° C. for 6 hours. The resulting product is hydrolyzed by treatment with steam at 160° C. to produce an acidic intermediate. The acidic intermediate is then converted to a basic salt by mixing with twice its volume of mineral oil, 2 moles of barium hydroxide and 0.7 mole of phenol and carbonating the mixture at 150° C. to produce a fluid product.

A basic metal detergent especially useful with the metal salt of this invention is derived from a fatty acid or ester having at least about 12, preferably up to about 30, aliphatic carbon atoms in the fatty radical. Such metal detergent may be obtained by carbonating a fatty acid or ester in the presence of from 0.1 to 10 equivalents (per equivalent of the acid or ester) of a phenolic promoter and a stoichiometric excess of a metal base such as calcium hydroxide, barium hydroxide, or strontium oxide. The preparation of such metal detergent is described in U.S. Patent No. 2,971,014.

An example of such metal detergent is a basic barium detergent derived from a fatty ester and prepared by the following procedure: a mixture of 423 grams (1 equivalent) of sperm oil, 123 grams (0.602 equivalent) of heptylphenol, 1214 grams of mineral oil and 452 grams of water is treated at 70° C. with 612 grams (8 equivalents) of barium oxide. The mixture is stirred at the reflux temperature for 1 hour and then at 150° C. while carbon dioxide is bubbled into the mixture beneath its surface. The carbonated product is filtered and the filtrate has a sulfate ash content of 35%.

Other additives useful in lubricating compositions containing the metal salt of this invention include hindered phenols, sulfurized fatty acid esters, phosphosulfurized fatty acid esters, polysulfides, phosphites, metal phenates, etc.

The hindered phenols are those in which the carbon atoms at both ortho positions to the phenolic group contain substantially large substituents so as to cause hindrance of the phenolic group. The common substituents are the secondary and tertiary alkyl radicals such as isopropyl, tert-butyl, tert-pentyl, sec-pentyl, cyclohexyl, and tert-octyl radicals. They likewise may be aryl radicals or large polar radicals such as bromo or nitro radicals. Examples of the hindered phenols include 2,6-di-sec-butylphenol, 2,4-di-tert-butylphenol, 2,6-di-tert-octyl - 4 - sec-pentylphenol, 2-tert-pentyl-6-tert-hexylphenol, 2-tert-butyl-4-cyclohexyl-6-heptylphenol, 4,4'-bis-methylene - (2,6-di-tert-butylphenol), 4,4'-methylene-bis(2-tert-butyl-6-sec-butylphenol), 2,4-dimethyl-6-tert-butylphenol, 2,6-di-tert-butyl - 6 - methylphenol, and bis-(3,5-di-tert-butyl-4-hydroxybenzyl)sulfide.

The sulfurized esters of the fatty acids are obtained by the treatment of the esters with a sulfurizing agent such as sulfur or a sulfur halide, e.g., sulfur monochloride or sulfur dichloride. The esters are exemplified by methyl oleate, methyl stearate, allyl stearate, isopropyl myristate, cyclohexyl ester of tall oil acid, ethyl palmitate, iso-octyl laurate, diester of ethylene glycol with stearic acid, tetraester of penta-erythritol with stearic acid, etc. Likewise useful are esters of higher alcohols or commercial alcohol mixtures such as octadecyl alcohol and sperm oil alcohol, and phenols such as phenol, naphthol, p-cresol, and o,p-dihexylphenol. The sulfurization is effected most conveniently at temperatures between 100° C. and 250° C. More than one atom of sulfur can be incorporated into the ester by the use of an excess of the sulfurizing agent. For the purpose of this invention sulfurized esters having as many as 4 or 5 atoms of sulfur per molecule have been found to be useful. Examples include sulfurized sperm oil having a sulfur content of 5% sulfurized tall oil having a sulfur content of 9%, sulfurized methyl oleate having a sulfur content of 3%, and sulfurized stearyl stearate having a sulfur content of 15%.

Still another class of the fatty compounds consists of the phosphosulfurized fatty acid ester mentioned above. They are obtained by the treatment of the esters with a phosphorus sulfide, such as phosphorus pentasulfide, phosphorus sesquisulfide, or phosphorus heptasulfide. The treatment is illustrated by mixing an ester with from about 0.5% to 25% of a phosphorus sulfide at a temperature within the range from about 100° C. to 250° C. The product contains both phosphorus and sulfur but the precise chemical constitution of such a product is not clearly understood. These and other methods for preparing the sulfurized esters and phosphosulfurized esters are known in the art.

The polysulfides include principally aliphatic and cycloaliphatic disulfides, trisulfides, tetrasulfides, pentasulfides, or higher polysulfides. The term "polysulfide" designates a compound in which two substantially hydrocarbon radicals are joined to a group consisting of at least 2 sulfur atoms. It is represented for the most part by any of the structural formulas below:

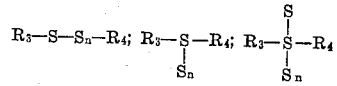

wherein $R_3$ and $R_4$ are alkyl or cycloalkyl radicals and $n$ is an integer usually less than 6. The nature of the linkage between the sulfur atoms is not clearly understood. It is believed, however, that such linkage may be described by a single covalent bond, a double bond, or a coordinate covalent bond. The polysulfides containing at least about 6 carbon atoms per molecule have greater oil-solubility and are generally preferred. Specific examples of such polysulfides are diisobutyl trisulfide, diisopentyl trisulfide, di-n-butyl tetrasulfide, dicyclopentyl disulfide, di-methyl-cyclohexyl tetrasulfide, di-2-ethylhexylpentyl disulfide, dipentyl trisulfide, di-beta-pinyl pentasulfide, cyclohexyl cyclopentyl trisulfide, diparaffin wax trisulfide, di-terpenyl disulfide, didodecyl trisulfide, dibehenyl trisulfide, and diisobutyl hexa-sulfide. Other polysulfides, including polar-substituted sulfides, are exemplified by di(omega-bromopentyl) trisulfide.

The preparation of the polysulfide may be accomplished by any of the various processes which are known and disclosed in the art including, for example, the reaction of a chlorohydrocarbon with an alkaline earth polysulfide, the reaction of a mercaptan with sulfur and/or sulfur halide, the reaction of saturated and unsaturated hydrocarbons with sulfur and/or sulfur halides, the reaction of a hydrocarbon monosulfide with sulfur, etc.

The phosphites useful herein are the di- and tri-hydrocarbon esters of phosphorus acid. Examples of the phosphites are: dibutyl phosphite, diheptylphosphite, dicyclohexylphosphite, tri-(pentylphenyl) phosphite, tris(dipentylphenyl) phosphite, didecyl phosphite, di-stearyl phosphite, tris-(hexapropylene-substituted phenyl) phosphite, tri-hexyl phosphite, di-heptyl phenyl phosphite, and tri(m-chloro-p-heptylphenyl) phosphite.

The alkaline earth metal salts of the alkylated phenols include principally the salts of magnesium, barium, calcium, and strontium with phenolic substances containing an alkyl substituent having at least about 7 carbon atoms. The phenols are exemplified by alkyl phenols, alkyl naphthols, sulfurized alkyl phenols, and the condensation products of alkyl phenols with an aldehyde. Specific examples include magnesium octylphenate, barium polypropylene-substituted phenate in which the polypropylene substituent has a molecular weight of 500, calcium salt of alpha-dodecyl-beta-naphthyl, barium salt of bis(heptylphenol) sulfide, calcium salt of bis(nonylphenol) sulfide, calcium salt of the condensation product of two moles of heptylphenol with formaldehyde, barium dodecylphenate, and strontium polyisobutene-substituted phenate in which the polyisobutene substituent has a molecular weight of 350.

The metal salt of this invention is usually stable to thermal degradation. Because of this high thermal stability, the metal salt is especially desirable as a lubricant additive in instances where the additive, an oil concentrate containing it, or a lubricant containing it is likely to be subjected to relatively high temperatures under storage conditions or service conditions. The thermal stability of the metal salt of this invention is shown by the test results shown in Table I below. The test consists of maintaining an oil concentrate of the additive at 202° C. for a specified period and measuring the amount of gaseous decomposition products formed during the test. A small amount of gaseous decomposition products indicates a high thermal stability of the additive and the concentrate.

TABLE I

| Additive Concentrate | Test Results | |
|---|---|---|
| | Test Period in Minutes | Milliliters of Gas Evolved |
| A.... Zn salt of a mixture of diisooctyl phosphorodithioic acid and di(isopropylphenyl) phosphinodithioic acid, 60:40 molar ratio (14.3% mineral oil solution). | 40 | 0 |
| B.... Zn salt of di-isooctyl phosphorodithioic acid (10% mineral oil solution). | 25 | 30 |
| C.... Zn salt of di(isopropylphenyl) phosphinodithioic acid. | No result [1] | |

[1] Crystalline compound. Oil concentrate cannot be prepared because of oil-insolubility.

The metal salt of this invention is especially effective to impart oxidation resistance to lubricants. Its effectiveness is demonstrated by the results of an oxidation test shown in Table II below. The test consists of bubbling air at a rate of 1.25–1.3 cubic feet per hour into 350 grams of a lubricant sample having immersed therein an oxidation catalyst (consisting of 120 grams of iron, 120 grams of copper, and 31 grams of lead) at 302° F. and measuring the viscosity change of the lubricant at regular intervals until either a sharp increase in the viscosity occurs or sediment develops. The appearance of sediment indicates the formation of a significant quantity of oxidation products and the test period up to the appearance of such sediment is a measurement of the oxidation resistance of the lubricant. The transmission lubricant of the test is obtained by incorporating the metal salt of this invention in a lubricant consisting of a mineral lubricating oil having a viscosity value of 38–40 Saybolt Universal seconds at 210° F. and containing 4.25% (by weight) of a polyacrylate viscosity improving additive, 3% of a barium carboxylate detergent, and 1.33% of a barium sulfonate detergent. It should be noted that such transmission lubricant cannot be prepared from a zinc salt of di(isopropylphenyl) phosphinodithioate acid (present as a component in the metal salt of Lubricant B), nor from a zinc salt of di(chlorophenyl) phosphinodithioic acid (present as a component in Lubricants C and E) because of the oil-insolubility of such zinc salts.

TABLE II

| Transmission Lubricant Containing— | | Test Results |
|---|---|---|
| Metal Salt Additive | Concentration, Percent Weight as Phosphorus | Period of Testing Before Sedimentation, hours |
| A [1].. Zn salt of di-isooctyl phosphorodithioic acid. | 0.05 | 88 |
| | 0.1 | 88 |
| | 0.4 | 88 |
| B.... Zn salt of a mixture of di-isooctyl phosphorodithioic acid and di(isopropylphenyl) phosphinodithioic acid, 60:40 molar ratio. | 0.05 | 112 |
| | 0.1 | 136 |
| C.... Zn salt of a mixture of di-isooctyl phosphorodithioic acid and di(chlorophenyl) phosphinodithioic acid, 60:40 molar ratio. | 0.05 | 96 |
| | 0.1 | 120 |
| D [1].. Zn salt of di(propylene Tetramer-substituted phenyl) phosphorodithioic acid. | 0.05 | 88 |
| | 0.1 | 112 |
| D.... Zn salt of a mixture of di-(propylene tetramer-substituted phenyl)phosphorodithioic acid and di(chlorophenyl) phosphinodithioic acid, 60:40 molar ratio. | 0.1 | 120 |

[1] Baseline lubricant.

The effectiveness of the metal salt of this invention as an additive in transmission lubricants is shown by a Powerglide Transmission Lubricant Test. The test results are shown in Table III. The lubricant used in the test is an automatic transmission lubricant base oil (having a viscosity within the range of 45–55 Saybolt Universal seconds at 210° F. and a viscosity index within the range of from 130 to 140 and prepared from a mineral lubricating oil having incorporated therein a suitable amount of a commercial viscosity index improver) containing 3% (by weight) of a barium carboxylate detergent, 0.5% of barium sulfate ash as a basic barium sulfonate detergent, 20 parts per million of a silicon anti-foam agent and 0.1% of phosphorus as the metal salt of this invention. This test measures particularly the effectiveness of a lubricant in preventing wear and deterioration of the clutch plates of automobile transmissions. It consists in operating a Powerglide transmission driven by a Chevrolet engine for 5000 cycles, each cycle consisting of 6 seconds of open throttle operation followed by 6 seconds closed throttle operation. A cycle begins with the transmission in low range. The engine is accelerated to 4100 r.p.m. and 370 ft. lb. torque; at this point, up shift occurs. The throttle is then closed allowing the engine to decelerate and the transmission to shift back to low range. The operating conditions for the transmission and the engine are as follows:

| | |
|---|---|
| Engine water outlet temperature_____° F__ | 170°±5 |
| Engine oil temperature (maximum)___° F__ | 250 |
| Transmission governor temperature____° F__ | 190°±2 |
| Engine speed at upshift_____r.p.m__ | 4200–4150 |
| Clutch apply-pressure at shift_____p.s.i__ | 88–90 |
| Dynamic torque at shift_____foot-pound__ | 360–375 |
| Governor cavity pressure (maximum)_p.s.i__ | 12±1 |
| Governor cavity pressure (minimum)_p.s.i__ | 1.5–2.5 |

At the end of the test, the transmission is dismantled and inspected with respect to the condition and wear of the clutch plate. A transmission lubricant is considered to pass the test if the clutch plate shows no worse than light flaking and the plate wear is less than 0.08 inch.

TABLE III

| Metal Salt Additive | Test Duration, (cycles) | Test Results | |
|---|---|---|---|
| | | Plate Wear | Overall Result |
| Zn salt of a mixture of di-isooctyl phosphorodithioic acid and di(iso-propylphenyl) phosphinodithioic acid (Example 3). | 5,000 | Pass | Pass. |
| Zn salt of di-isooctyl phosphorodithioic acid (baseline). | 1,112 | Failed at the end of 1,112 cycles because of the loss of the necessary frictional characteristics for permitting proper engagement of clutch plates. | |

What is claimed is:

1. A metal salt of a phosphorus acid mixture comprising (A) a di-hydrocarbon phosphorothioic acid having at least 3 aliphatic carbon atoms in each hydrocarbon radical and (B) a diaryl phosphinothioic acid wherein the aryl group is selected from the class consisting of phenyl, halophenyl, and alkylphenyl having up to about 6 carbon atoms in the alkyl substituent; wherein the molar ratio of (A) to (B) is within the range of from about 1:2 to 1:0.05 and the ratio of aliphatic carbon atoms to phosphorus atoms is at least about 6.

2. The metal salt of claim 1 wherein the acid of (A) is a dialkyl phosphorodithioic acid.

3. The metal salt of claim 1 wherein the acid of (B) is a di(alkylphenyl) phosphinodithioic acid.

4. The metal salt of claim 1 wherein the acid of (A) is a dialkyl phosphorodithioic acid having from 3 to about 30 carbon atoms in each alkyl radical; the acid of (B) is a di(alkylphenyl) phosphinodithioic acid having up to about 6 carbon atoms in the alkyl substituent; the molar ratio of (A) to (B) is within the range of from about 1:1 to 1:0.05; and the ratio of aliphatic carbon atoms to phosphorus atoms is at least about 8.

5. A metal salt of a phosphorus acid mixture comprising (A) a dialkyl phosphorodithioic acid having from 3 to about 30 carbon atoms in each alkyl radical and (B) a di(halophenyl) phosphinodithioic acid; wherein the molar ratio of (A) to (B) is within the range of from about 1:1 to 1:0.05 and the ratio of aliphatic carbon atoms to phosphorus atoms is at least about 8.

6. The metal salt of claim 5 wherein the metal is zinc.

7. The metal salt of claim 5 wherein the metal is barium.

8. The metal salt of claim 5 wherein the metal is lead.

9. The metal salt of claim 5 wherein the acid of (A) is a dialkyl phosphorodithioic acid having from about 6 to 12 carbon atoms in each alkyl radical; the acid of (B) is a di(chlorophenyl) phosphorodithioic acid; and the molar ratio of (A) to (B) is within the range of from about 1:1 to 1:0.2; and the metal is zinc.

10. The metal salt of claim 5 wherein the acid of (A) is dioctyl phosphorodithioic acid; the acid of (B) is di(isopropylphenyl) phosphinodithioic acid; the molar ratio of (A) to (B) is within the range from about 1:1 to 1:0.2; and the metal is zinc.

11. The metal salt of claim 5 wherein the acid of (A) is dioctyl phosphorodithioic acid; the acid of (B) is di(chlorophenyl) phosphinodithioic acid; the molar ratio of (A) to (B) is within the range from about 1:1 to 1:0.2; and the metal is zinc.

12. The metal salt of claim 5 wherein the acid of (A) is di-isooctyl phosphorodithioic acid; the acid of (B) is di(chlorophenyl) phosphinodithioic acid; the molar ratio of (A) to (B) is about 1:0.7; and the metal is zinc.

13. A zinc salt of a phosphorus acid mixture comprising (A) a dialkyl phosphorodithioic acid having from 3 to about 30 carbon atoms in each alkyl radical and (B) a di(alkylphenyl) phosphinodithioic acid having up to about 6 carbon atoms in the alkyl substituent; wherein the molar ratio of (A) to (B) is within the range of from about 1:1 to 1:0.2 and the ratio of aliphatic carbon atoms to phosphorus atoms is at least about 6.

14. The zinc salt of claim 9 wherein the acid of (A) is dioctyl phosphorodithioic acid.

15. The zinc salt of claim 9 wherein each alkyl radical of the dialkyl phosphorodithioic acid of (A) has from about 6 to 12 carbon atoms.

16. The metal salt of claim 13 wherein the acid of (A) is dioctyl phosphorodithioic acid; the acid of (B) is di(isopropylphenyl) phosphinodithioic acid; the molar ratio of (A) to (B) is within the range from about 1:1 to 1:0.2; and the metal is lead.

17. The metal salt of claim 13 wherein the acid of (A) is dioctyl phosphorodithioic acid; the acid of (B) is di(isopropylphenyl) phosphinodithioic acid; the molar ratio of (A) to (B) is within the range from about 1:1 to 1:0.2; and the metal is barium.

18. The metal salt of claim 13 wherein the acid of (A) is di-isooctyl phosphorodithioic acid; the acid of (B) is di(isopropylphenyl) phosphinodithioic acid; the molar ratio of (A) to (B) is about 1:0.7; and the metal is zinc.

References Cited

UNITED STATES PATENTS

| | | | |
|---|---|---|---|
| 2,797,238 | 6/1957 | Miller et al. | 252—32.7 |
| 2,932,614 | 4/1960 | Lynch et al. | 252—32.7 |
| 3,000,822 | 9/1961 | Higgins et al. | 252—32.7 |

DANIEL E. WYMAN, *Primary Examiner.*

PATRICK P. GARVIN, *Examiner.*

UNITED STATES PATENT OFFICE
CERTIFICATE OF CORRECTION

Patent No. 3,376,221　　　　　　　　Dated April 2, 1968

Inventor(s) Thomas A. Butler

It is certified that error appears in the above-identified patent and that said Letters Patent are hereby corrected as shown below:

Column 13, line 39, that is, Claim 9, line 4 thereof, "phosphorodithioic" should be --phosphinodithioic--; line 41, that is, Claim 10, line 1 thereof, the number "5" should be --4--.

Signed and sealed this 17th day of August 1971.

(SEAL)
Attest:

EDWARD M. FLETCHER, JR.　　　　　　WILLIAM E. SCHUYLER, JR.
Attesting Officer　　　　　　　　　Commissioner of Patents